(12) United States Patent
Eddy et al.

(10) Patent No.: US 7,575,827 B2
(45) Date of Patent: *Aug. 18, 2009

(54) CONDUCTIVE COATINGS FOR PEM FUEL CELL ELECTRODES

(75) Inventors: David S. Eddy, Washington, MI (US); Jeannine Hogan, legal representative, White Lake, MI (US); Joseph V. Mantese, Shelby Township, MI (US); Charles D. Oakley, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 550 days.

This patent is subject to a terminal disclaimer.

(21) Appl. No.: 11/386,930

(22) Filed: Mar. 22, 2006

(65) Prior Publication Data

US 2006/0222927 A1    Oct. 5, 2006

Related U.S. Application Data

(63) Continuation-in-part of application No. 10/674,245, filed on Sep. 29, 2003, which is a continuation-in-part of application No. 10/224,871, filed on Aug. 21, 2002, now Pat. No. 7,037,617.

(51) Int. Cl.
*H01M 2/02*    (2006.01)

(52) U.S. Cl. .............................. 429/34; 429/32; 429/35; 429/38; 429/12

(58) Field of Classification Search .................. 429/34, 429/32, 35, 38, 115, 12
See application file for complete search history.

(56) References Cited

U.S. PATENT DOCUMENTS

| 3,235,476 | A | 2/1966 | Boyd et al. |
| 3,671,226 | A | 6/1972 | Komata et al. |
| 4,468,416 | A | 8/1984 | Asano et al. |
| 5,441,670 | A | 8/1995 | Shimamune et al. |
| 5,942,349 | A | 8/1999 | Badwal et al. |
| 6,280,868 | B1 | 8/2001 | Badwal et al. |
| 6,321,145 | B1 | 11/2001 | Rajashekara |

(Continued)

FOREIGN PATENT DOCUMENTS

| JP | 60224812 | 11/1985 |
| JP | 07073871 | 3/1995 |

OTHER PUBLICATIONS

Search Report, European Patent Office, Mar. 20, 2006, Application No. EP 06075101.3, Munich, Germany.

(Continued)

*Primary Examiner*—Laura S Weiner
(74) *Attorney, Agent, or Firm*—Paul L. Marshall

(57) ABSTRACT

A bipolar plate for use in a stack of fuel cell modules includes a bipolar plate that has at least one surface containing a metal alloy oxidizable to form a metal oxide having a surface resistance no greater than about 0.007 ohm-cm$^2$. The metal alloy is oxidized to form a layer of metal oxide having a thickness of about $10^{-8}$ cm to about $10^{-2}$ cm and a resistivity no greater than about $10^7$ ohm-cm. In addition to their use in fuel cells, the alloys can be employed to form conductive surfaces of electrical contacts useful for various electrical devices.

29 Claims, 1 Drawing Sheet

U.S. PATENT DOCUMENTS

| | | | |
|---|---|---|---|
| 6,346,182 | B1 | 2/2002 | Bradley |
| 6,423,896 | B1 | 7/2002 | Keegan |
| 6,455,185 | B2 | 9/2002 | Bircann et al. |
| 6,485,852 | B1 | 11/2002 | Miller et al. |
| 6,509,113 | B2 | 1/2003 | Keegan |
| 6,551,734 | B1 | 4/2003 | Simpkins et al. |
| 6,562,496 | B2 | 5/2003 | Faville et al. |
| 6,608,463 | B1 | 8/2003 | Kelly et al. |
| 6,613,468 | B2 | 9/2003 | Simpkins et al. |
| 6,613,469 | B2 | 9/2003 | Keegan |
| 6,620,541 | B2 | 9/2003 | Fleck et al. |
| 6,627,339 | B2 | 9/2003 | Haltiner, Jr. |
| 6,630,264 | B2 | 10/2003 | Haltiner, Jr. et al. |
| 6,805,989 | B2 | 10/2004 | Seido et al. |
| 6,843,960 | B2 | 1/2005 | Krumpelt et al. |
| 6,963,117 | B2 | 11/2005 | Yang et al. |
| 7,037,617 | B2 * | 5/2006 | Eddy et al. .................. 429/34 |
| 2004/0058205 | A1 | 3/2004 | Mantese et al. |
| 2004/0247978 | A1 | 12/2004 | Shimamune |
| 2005/0189041 | A1 | 9/2005 | Mantese et al. |
| 2007/0254194 | A1 | 11/2007 | Mantese et al. |

OTHER PUBLICATIONS

Non-Final Office Action, US Patent and Trademark Office, Mailed Mar. 5, 2009, U.S. Appl. No. 11/039,579, Alexandria, VA, US.

Restriction Requirement, US Patent and Trademark Office, Mailed Sep. 21, 2007, U.S. Appl. No. 11/039,579, Alexandria, VA, US.

Non-Final Office Action, US Patent and Trademark Office, Mailed Jan. 10, 2008, U.S. Appl. No. 11/039,579, Alexandria, VA, US.

U.S. Patent and Trademark Office, Notice of Non-Compliant Amendment, Mailed May 14, 2008, U.S. Appl. No. 11/039,579, Alexandria, VA, US.

Final Office Action, US Patent and Trademark Office, Mailed Sep. 3, 2008, U.S. Appl. No. 11/039,579, Alexandria, VA, US.

Advisory Action, US Patent and Trademark Office, Mailed Oct. 7, 2008, U.S. Appl. No. 11/039,579, Alexandria, VA, US.

Non-Final Office Action, US Patent and Trademark Office, Mailed Oct. 4, 2006, U.S. Appl. No. 10/674,245, Alexandria, VA, US.

Final Office Action, US Patent and Trademark Office, Mailed Mar. 29, 2007, U.S. Appl. No. 10/674,245, Alexandria, VA, US.

Rstriction Requirement, US Patent and Trademark Office, Mailed Jun. 22, 2006, U.S. Appl. No. 10/674,245, Alexandria, VA, US.

Restriction Requirement, US Patent and Trademark Office, Mailed Mar. 24, 2006, U.S. Appl. No. 10/674,245, Alexandria, VA, US.

Non-Final Office Action, US Patent and Trademark Office, mailed Apr. 21, 2008, U.S. Appl. No. 11/825,037, Alexandria, VA, US.

Non-Final Office Action, US Patent and Trademark Office, Mailed Nov. 5, 2008, U.S. Appl. No. 11/825,037, Alexandria, VA, US.

Non-Final Office Action, US Patent and Trademark Office, Mailed Sep. 27, 2004, U.S. Appl. No. 10/224,871, Alexandria, VA, US.

Non-Final Office Action, US Patent and Trademark Office, Mailed Mar. 15, 2005, U.S. Appl. No. 10/224,871, Alexandria, VA, US.

Final Office Action, US Patent and Trademark Office, Mailed Aug. 1, 2005, U.S. Appl. No. 10/224,871, Alexandria, VA, US.

Advisory Action, US Patent and Trademark Office, Mailed Oct. 24, 2005, U.S. Appl. No. 10/224,871, Alexandria, VA, US.

Notice of Allowance and Fees Due, etc., US Patent and Trademark Office, Mailed Dec. 29, 2005, U.S. Appl. No. 10/224,871, Alexandria, VA, US.

* cited by examiner

CONDUCTIVE COATINGS FOR PEM FUEL CELL ELECTRODES

CROSS-REFERENCE TO RELATED APPLICATIONS

This application is a continuation-in-part of U.S. application Ser. No. 10/224,871, filed Aug. 21, 2002, now U.S. Pat. No. 7,037,617 the disclosure of which is incorporated herein by reference.

This application is further related to co-pending U.S. application Ser. No. 11/039,579, filed Jan. 20, 2005, which is a continuation-in-part of co-pending U.S. application Ser. No. 10/674,245, filed Sep. 29, 2003, which is a continuation-in part of U.S. application Ser. No. 10/224,871, filed Aug. 21, 2002, now U.S. Pat. No. 7,037,617 the disclosures of which are incorporated herein by reference.

TECHNICAL FIELD

The present invention relates to fuel cells; more particularly, to fuel cells having bipolar plate electrodes which separate the individual modules of the fuel cell stack; and most particularly, to means for increasing the reliability and durability of the electrical contact surface of a bipolar plate electrode.

BACKGROUND OF THE INVENTION

Fuel cell assemblies employing a plurality of individual fuel cell modules are well known. Each module has an anode and a cathode. In a proton-exchange fuel cell, the anode and cathode are separated by a catalytic proton exchange membrane (PEM) in which the modules in the stack typically are connected in series electrically through bipolar plates to provide a desired total output voltage. Fuel in the form of hydrogen and water vapor, or hydrogen-containing mixtures such as "reformed" hydrocarbons, is flowed through a first set of reaction channels formed in a first surface of the bipolar plate adjacent the anode. Oxygen, typically in the form of air, is flowed through a second set of reaction channels formed in a second surface of the bipolar plate adjacent the cathode.

In a PEM fuel cell, hydrogen is catalytically oxidized at the anode-membrane interface. The resulting proton, $H^+$, migrates through the membrane to the cathode-membrane interface where it combines with ionic oxygen to form water. Electrons flow from the anode through a load to the cathode, doing electrical work in the load.

In fuel cells, a long-term electrical continuity problem is well known in the art. Metals typically used to form bipolar plates, for example, aluminum or stainless steel, can corrode and/or form high-resistance oxide passivation layers on the surface of the bipolar plates because of electrochemical activity at these surfaces. These high resistance oxide layers can inhibit corrosion, but they may also limit the current-collecting ability of the bipolar plates, thereby significantly lowering the efficiency and output of a fuel cell. In the prior art, bipolar plates are known to be coated with noble metals such as gold and platinum to prevent corrosion and the formation of high resistant passivation layers on the electrical contact surfaces, but such coatings are so expensive as to impact the widespread use of cost-effective fuel cells. Other approaches to improving the electrical interconnects of fuel cells are described in the following patents, the disclosures of which are all incorporated herein by reference:

U.S. Pat. No. 6,805,989 discloses a separator for a solid polymer electrolyte fuel cell that comprises a cladding material that covers a highly conductive metal with highly corrosion-resistant titanium or titanium alloy, at least a portion of which is covered by a carbon material.

U.S. Pat. No. 6,843,960 discloses a method for making metal plates for planar solid oxide fuel cells from powders of predominantly iron alloys that also include small amounts of chromium, lanthanum, yttrium, and strontium.

U.S. Pat. No. 6,280,868 discloses an electrical interconnect device for a planar fuel cell that comprises a chromium-containing substrate having on the anode-contacting side an oxidation-resistant coating that comprises an outer oxygen barrier layer comprising nickel, a noble metal other than silver, or an alloy of these metals and an electrically conducting metal barrier layer comprising niobium, tantalum, silver, or an alloy of these metals between the substrate and the upper layer.

U.S. Pat. No. 5,942,349 discloses an electrical interconnect device for a planar fuel cell that comprises a chromium-containing substrate having on the cathode-contacting side a coating comprising an oxide surface layer comprising at least one metal M selected from Mn, Fe, Co, and Ni, and an M, Cr spinel layer between the substrate and the oxide surface layer.

U.S. Pat. No. 6,620,541 discloses a high temperature fuel cell comprising an electrolyte/electrode unit having an anode, an interconnector having a fuel gas side, and first and second metallic functional layers applied one above the other on the fuel gas side of the interconnector, the first functional layer containing nickel and the underlying second functional layer containing copper, the first functional layer being connected to the anode by an electrical conductor.

SUMMARY OF THE INVENTION

The present invention is directed to a bipolar plate for use in a stack of fuel cell modules, wherein the bipolar plate includes at least one surface comprising a metal alloy that is oxidizable to form a metal oxide having a surface resistance no greater than about 0.007 ohm-cm$^2$.

The invention is further directed to a bipolar plate for use in a stack of fuel cell fuel cell modules wherein the bipolar plate comprising at least one surface comprising a metal alloy oxidizable to form a layer of metal oxide having a thickness of about $10^{-8}$ cm to about $10^{-2}$ cm and a resistivity no greater than about $10^7$ ohm-cm.

BRIEF DESCRIPTION OF THE DRAWINGS

The present invention will now be described, by way of example, with reference to the accompanying drawings, in which.

DESCRIPTION OF THE PREFERRED EMBODIMENTS

The bipolar plate of the present invention includes at least one surface comprising a metal alloy that is oxidizable to form a metal oxide having a surface resistance no greater than about 0.007 ohm-cm$^2$, preferably no greater than about 0.0015 ohm-cm$^2$. The metal alloy is oxidizable to form a layer of metal oxide having a thickness of about $10^{-8}$ cm to about $10^{-2}$ cm, preferably about $10^{-8}$ cm to about $10^{-6}$ cm, and a resistivity no greater than about $10^7$ ohm-cm, preferably about $10^2$ ohm-cm to about $10^6$ ohm-cm.

In accordance with the present invention, electrical contact surfaces of the bipolar plate are formed of inexpensive metals that are oxidizable to form conductive surface oxide passivation layers, thus maintaining high electrical conductivity and continuity through the bipolar plates of a fuel cell. Alloy composition systems such as, but not limited to, Ti—Nb, Ti—Ta, La—Sr—Cr, and La—Sr—Co form oxide passivation layers that are highly conductive. The passivation layers may be formed in situ after assembly of a fuel cell or may be provided in an oxidative step during manufacture prior to assembly. The bipolar plate may be formed entirely of one or more of such alloys or may be formed of an inexpensive substrate metal having the alloys coated thereupon.

Figure 1:
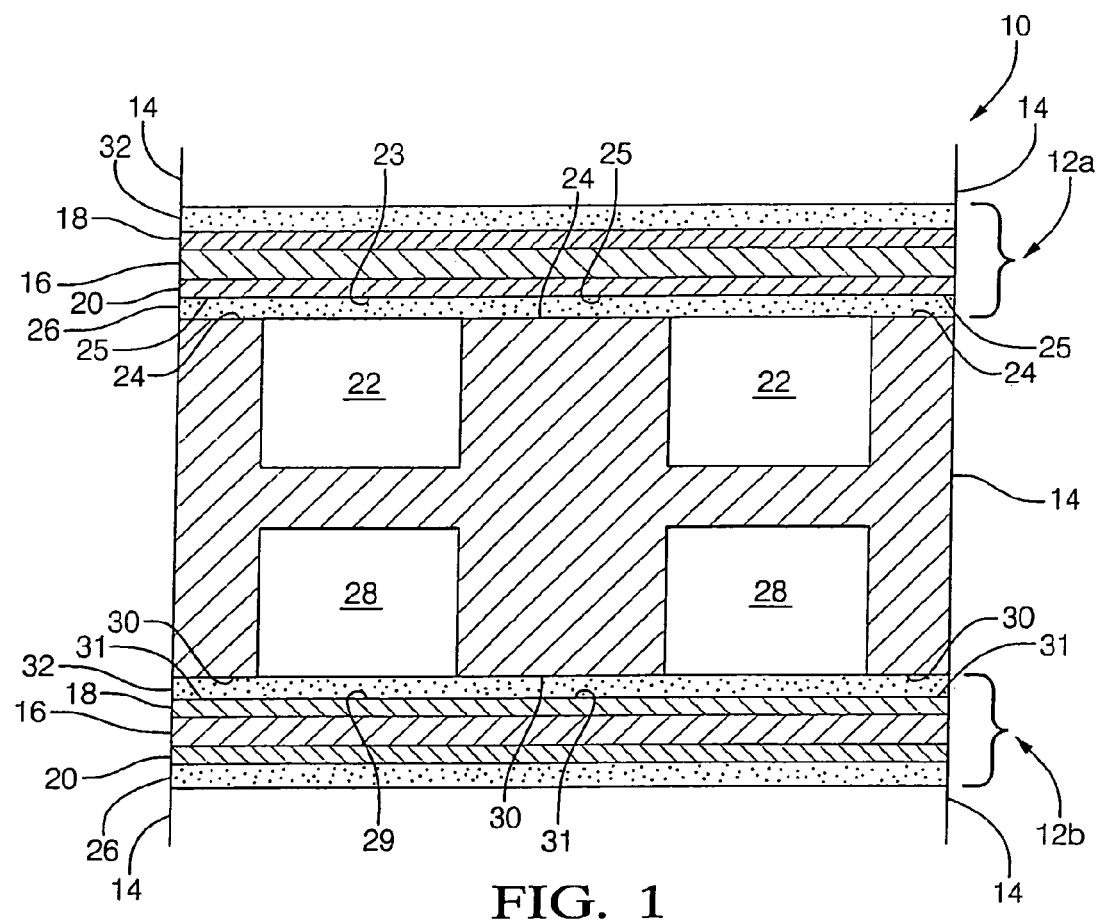
FIG. 1 is a schematic cross-sectional view of a portion of a PEM fuel cell stack showing the relationship of bipolar plates formed in accordance with the invention to the anodes and cathodes thereof.

Referring to FIG. 1, a portion 10 of a multiple-cell PEM fuel cell stack includes a first fuel cell unit 12a and a second fuel cell unit 12b, separated and mechanically/electrically connected by a bipolar plate 14. Each fuel cell 12a,12b comprises a proton exchange membrane 16 separating an anode 18 and a cathode 20 in known fashion. A complete fuel cell stack (not shown) comprises a plurality of fuel cells 12 similarly separated and connected by a plurality of bipolar plates 14.

Each bipolar plate 14 is provided with a first set of channels 22 for providing oxygen, typically in the form of air, to the cathode surface 23. Channels 22 are separated by first lands 24 for making mechanical and electrical contact with cathode 20. Optionally, a conductive cathode diffuser 26 may be provided between cathode 20 and bipolar plate 14 to permit air to diffuse laterally and thereby reach those portions 25 of the cathode surface 23 covered by first lands 24.

Each bipolar plate 14 is provided with a second set of channels 28 for providing hydrogen fuel to the anode surface 29. Channels 28 are separated by second lands 30 for making mechanical and electrical contact with anode 18. Optionally, a conductive anode diffuser 32 may be provided between anode 18 and bipolar plate 14 to permit fuel to diffuse laterally and thereby reach those portions 31 of the anode surface 29 covered by second lands 30.

It should be understood that in an actual bipolar plate, air and fuel channels 22 and 28 may be oriented orthogonally of each other.

Figure 2:
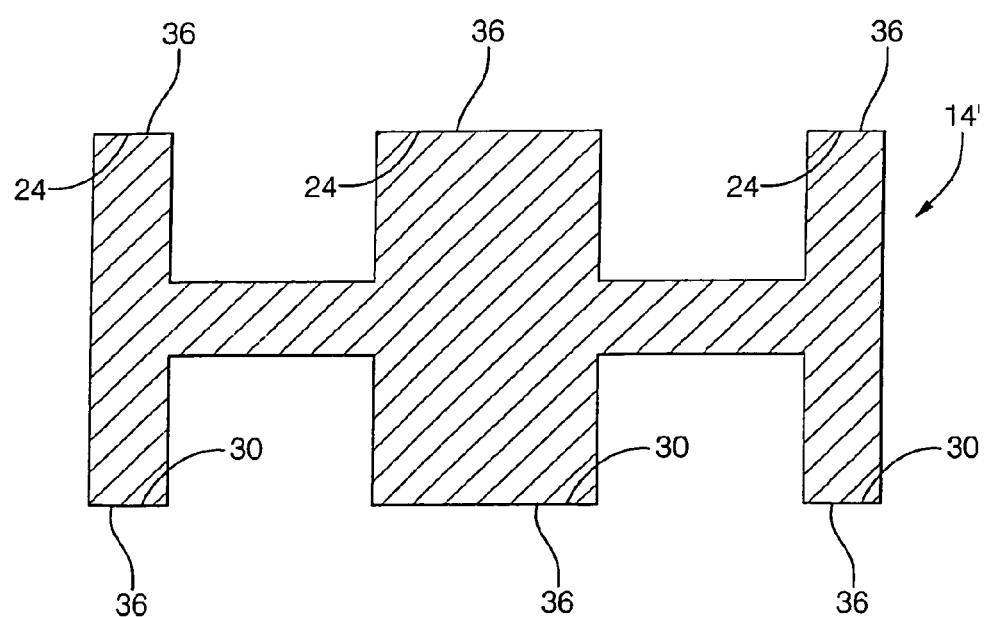
FIG. 2 is a schematic cross-sectional view of a bipolar plate in accordance with the invention.

Referring to FIG. 2, surface portions of lands 24,30 of improved bipolar plate 14' include metal alloys that are oxidizable to form surface passivation oxide layers having high electrical conductivity, defined by a surface resistivity less than about 0.007 ohms-cm$^2$. and preferably less than about 0.0035 ohms-cm$^2$ or less. By contrast, the comparable surface resistivity of surface-oxidized pure titanium is about 0.035 ohm-cm$^2$. Thus, oxide passivation layers formed in accordance with the invention provide a conductivity improvement on the order of about ten-fold or greater. Examples of suitable metals and alloy systems include, but are not limited to, Ti—Nb, Ti—Ta, La—Sr—Cr, and La—Sr—Co. Those skilled in the art of metal chemistry may recognize other suitable metals or metal combinations which may form conductive oxide passivation layers within the scope of the invention.

In a currently preferred embodiment, contact surfaces of lands 24,30 of a bipolar plate substrate 14' (formed of preferably aluminum or stainless steel) comprise a thin outer layer 36 of an alloy comprising between about 1 and about 3 atomic percent Nb or Ta and between about 97 and about 99 atomic percent Ti; most preferably, 1.5 atomic percent Nb or Ta and 98.5 atomic percent Ti. Such a layer is readily formed by any of several known methods, for example, by magnetron sputtering of Ti, Nb and Ta targets onto substrate 34, and can form an oxide layer having a surface resistance no greater than about 0.007 ohms-cm$^2$.

Preferably, layer 36 is subsequently treated thermally, chemically, and/or electrochemically in known fashion during manufacture of bipolar plate 14 to cause a portion of the metallic constituents of layer 36 to be converted to electrically-conductive oxides, for example, $Ti^{+3}{}_x Ti^{+4}{}_{(1-x)} Nb^{+5}{}_x O_2$ or $Ti^{+3}{}_x Ti^{+4}{}_{(1-x)} Ta^{+5}{}_x O_2$ where x represents the atomic fraction of Nb or Ta metal based, typically but not limited to the range of $0.01 \leq x \leq 0.03$. Alternatively, bipolar plate 14' containing layer 36 may be assembled into a fuel cell stack and layer 36 may be allowed to oxidize spontaneously by exposure to atmospheric oxygen and electrical current during operation of the fuel cell. Regardless of the process employed in its formation, the metal oxide layer has a thickness preferably of about $10^{-8}$ cm to about $10^{-4}$ cm, more preferably, about $10^{-8}$ cm to about $10^{-6}$ cm In a second embodiment in accordance with the invention, most or all of bipolar plate 14' is formed of metal material as recited hereinabove, the surfaces thereof then being oxidized to form layers 36.

Alloys having titanium (Ti) as the main metal component are useful for forming surface oxide layers in accordance with the present invention. Pure Ti exposed to atmospheric oxygen forms a passivating $TiO_2$ layer that prevents further corrosion of the bipolar plate but also, unfortunately, acts as an electrical insulator that limits current flow. However $TiO_2$ can be made conductive by doping with small concentrations of metals such as, for example, tantalum (Ta) or niobium (Nb).

In order to form a conductive passivating surface layer on an electrode formed of a Ti alloy, the surface atoms must be oxidized. A currently preferred means for providing such oxidation is via cyclic voltammetry (CV), discussed in the cross-referenced application Ser. No. 11/039,579. Obviously, however, other oxidation methods as may occur to one of skill in the art also fall within the scope of the present invention.

The following table presents surface resistance of oxides produced by CV oxidation of doped Ti alloys:

| Percent Dopant | Surface Resistance (ohm-cm$^2$) |
|---|---|
| 1% Ta | 0.0001 |
| 3% Ta | 0.00025 |
| 1% Nb | 0.00081 |
| 1.5% Nb | 0.00008 |
| 3% Nb | 0.00015 |

Alloys suitable for forming surface oxide layers in accordance with the present invention include, but are not limited to, the following: Y—Ba—Cu, La—Sr—Co, La—Sr—Cr, La—Sr—V, La—Ca—Mn, La—Sr—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Ni—Li, Cu—Ti, Cu—Fe, Cu—Mn, Cu—Al, Cu—Si, Sn—Sb, Sn—In, and combinations thereof.

In addition to their usefulness for forming a conductive metal oxide surface of bipolar plate included in a stack of fuel cell modules, the oxidizable metal alloys of the present invention are also advantageously employed to form contact surfaces for conducting electrical current between two elements of a wide variety of electrical devices, including battery-powered flashlights, electrical relays, header connectors, circuit board terminals, and computer peripheral back planes. The electrical connection between the contact surfaces must be continuous, particularly in oxidative environments, to ensure reliable operation of the electrical circuitry of the devices.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A bipolar plate for use in a stack of fuel cell modules, said bipolar plate comprising at least one contact surface for contact with another component in said stack, said at least one contact surface comprising a metal alloy oxidizable to form a metal oxide having a surface resistance no greater than about 0.007 ohm-cm$^2$, wherein said metal alloy is selected from the group consisting of: Y—Ba—Cu, La—Sr—Co, La—Sr—Cr, La—Sr—V, La—Ca—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Ni—Li, Cu—Ti, Cu—Fe, Cu—Mn, Cu—Al, Cu—Si, Sn—Sb, and combinations thereof.

2. The bipolar plate of claim 1 wherein said surface resistance is no greater than about 0.0015 ohm-cm$^2$.

3. The bipolar plate of claim 1 wherein said metal alloy is selected from the group consisting of Ti—Nb, Ti—Ta, La—Sr—Cr, La—Sr—Co, and combinations thereof.

4. The bipolar plate of claim 3 wherein said metal oxide is of the formula selected from the group consisting of Ti$^{+3}_x$Ti$^{+4}_{(1-x)}$Nb$^{+5}_x$O$_2$ and Ti$^{+3}_x$Ti$^{+4}_{(1-x)}$Ta$^{+5}_x$O$_2$ where x represents the atomic fraction of Nb or Ta in the range of $0.01 \leq x \leq 0.03$.

5. The bipolar plate of claim 1 wherein said at least one contact surface is a layer disposed on said bipolar plate.

6. The bipolar plate of claim 1 wherein said bipolar plate is formed of said metal alloy.

7. The bipolar plate of claim 1 wherein said surface is electrically connectable to a cathode of a fuel cell module.

8. The bipolar plate of claim 1 wherein said surface is electrically connectable to an anode of a fuel cell module.

9. The bipolar plate of claim 1 wherein said bipolar plate is included in a proton exchange membrane fuel cell.

10. The bipolar plate of claim 1 wherein said metal alloy comprises a surface layer disposed on a substrate.

11. The bipolar plate of claim 10 wherein said substrate comprises aluminum or stainless steel.

12. A bipolar plate for use in a stack of fuel cell fuel cell modules, said bipolar plate comprising at least one surface comprising a metal alloy oxidizable to a layer of metal oxide having a thickness of about 10$^{-8}$ cm to about 10$^{-2}$ cm and a resistivity no greater than about 10$^7$ ohm-cm, wherein said metal alloy is selected from the group consisting of: Y—Ba—Cu, La—Sr—Co, La—Sr—Cr, La—Sr—V, La—Ca—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Ni—Li, Cu—Ti, Cu—Fe, Cu—Mn, Cu—Al, Cu—Si, Sn—Sb, and combination thereof.

13. The bipolar plate of claim 12 wherein said resistivity of said layer of metal oxide is about 10$^2$ ohm-cm to about 10$^6$ ohm-cm.

14. The bipolar plate of claim 12 wherein said layer of metal oxide has a thickness of about 10$^{-8}$ cm to about 10$^{-7}$ cm.

15. The bipolar plate of claim 12 wherein said bipolar plate is included in a proton exchange membrane fuel cell.

16. The bipolar plate of claim 12 wherein said layer of metal oxide is disposed on a substrate.

17. The bipolar plate of claim 16 wherein said substrate comprises aluminum or stainless steel.

18. A fuel cell assembly comprising at least one bipolar plate having at least one contact surface for contact with another component in said fuel cell assembly, said at least one contact surface comprising a metal alloy oxidizable to form a metal oxide having a surface resistance no greater than about 0.007 ohms-cm$^2$, wherein said metal alloy is selected from the group consisting of: Y—Ba—Cu, La—Sr—Co, La—Sr—Cr, La—Sr—V, La—Ca—Mn, La—Nd—Ni, Ti—Ta, Ti—Nb, Ti—V, Ti—W, Ti—Mo, Ti—Zr—Ta,Ti—Zr—Nb, Cr—Ta, Cr—Nb, Cr—Ti, Cr—Zr, Sr—V, Ni—Li, Cu—Ti, Cu—Fe, Cu—Mn, Cu—Al, Cu—Si, Sn—Sb, and combinations thereof.

19. The fuel cell assembly of claim 18 wherein said metal alloy is selected from the group consisting of Ti—Nb, Ti—Ta, La—Sr—Cr, La—Sr—Co, and combinations thereof.

20. The fuel cell assembly of claim 18 comprising a proton exchange membrane fuel cell assembly.

21. A process for forming a bipolar plate for use in a fuel cell assembly, said process comprising the steps of:
  a) forming a substrate from a conductive metal; and
  b) depositing a contact layer on at least one surface of said substrate for contacting another component in said fuel cell assembly, said contact layer comprising a metal alloy oxidizable to a metal oxide having a surface resistance no greater than about 0.007 ohms-cm$^2$, wherein said metal alloy is selected from the group consisting of: Y—Ba—Cu, La—Sr—Co, La—Sr—Cr, La—Sr—V, La—Ca—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Ni—Li, Cu—Ti, Cu—Fe, Cu—Mn, Cu—Al, Cu—Si, Sn—Sb, and combinations thereof. , 22. The process of claim 21 further comprising the step of oxidizing at least a portion of said metal alloy to form a passivation layer comprising said metal oxide.

23. The process of claim 21 wherein said metal alloy is selected from the group consisting of Ti—Nb, Ti—Ta, La—Sr—Cr, La—Sr—Co, and combinations thereof.

24. The process of claim 21 wherein said substrate is formed from aluminum or stainless steel.

25. An electrical contact for use in an electrical device comprising a contact surface for contacting another component in said electrical device, said contact surface comprising a metal alloy oxidizable to form a metal oxide having a surface resistance no greater than about 0.007 ohm-cm$^2$, wherein said metal alloy is selected from the group consisting of: Y—Ba—Cu, La—Sr—Co, La—Sr—Cr, La—Sr—V, La—Ca—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Ni—Li, Cu—Ti, Cu—Fe, Cu—Mn, Cu—Al, Cu—Si, Sn—Sb, and combinations thereof.

26. The electrical contact of claim 25 wherein said surface resistance is no greater than about 0.0015 ohm-cm$^2$.

27. An electrical contact for use in an electrical device comprising a surface comprising a metal alloy oxidizable to form a metal oxide having a thickness of about 10$^{-8}$ cm to about 10$^{-2}$ cm and a resistivity no greater than about 10$^{-7}$ ohm-cm, wherein said metal alloy is selected from the group consisting of: Y—Ba—Cu, La—Sr—Co, La—Sr—Cr, La—Sr—V, La—Ca—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Ni—Li, Cu—Ti, Cu—Fe, Cu—Mn, Cu—Al, Cu—Si, Sn—Sb, and combinations thereof.

28. The electrical contact of claim 27 wherein said resistivity of said layer of metal oxide is about 10$^2$ ohm-cm to about 10$^6$ ohm-cm.

29. The electrical contact of claim 27 wherein said layer of metal oxide has a thickness of about 10$^{-8}$ cm to about 10$^{-7}$ cm.

* * * * *